Jan. 30, 1962   H. REIFURTH   3,019,009
HYDRAULIC SHOCK ABSORBER
Filed July 2, 1958   2 Sheets-Sheet 2

Inventor:
HANS REIFURTH
by
Mestern & Kollin
ATTORNEYS

United States Patent Office 3,019,009
Patented Jan. 30, 1962

3,019,009
HYDRAULIC SHOCK ABSORBER
Hans Reifurth, Klutherstrasse 23, Ennepetal-Altenvoerde, Westphalia, Germany
Filed July 2, 1958, Ser. No. 746,184
Claims priority, application Germany Aug. 7, 1957
6 Claims. (Cl. 267—64)

There are known hydropneumatic shock absorbers that essentially comprise a cylinder containing hydraulic liquid and compressed gas and a piston displaceable therein, the hydraulic liquid being separated from the compressed gas by a movable piston or else by a flexible partition. The separating means provided between compressed gas and hydraulic liquid must be movably arranged so that they may yield to the liquid displacement resulting from the stroke of the piston, thus being thrust by the practically incompressible hydraulic liquid into the compressible gas. The movable arrangement of the said separating means likewise allows for thermal expansion of the hydraulic liquid, which occasionally assumes considerable values owing to the conversion of energy into heat by the process of shock absorption. Displacement of the separating means to compensate for the volume of liquid displaced by the piston rod, in conjunction with the resulting compression of the gas cushion, provides the desired pneumatic cushioning action. On the other hand, the heat expansion of the hydraulic liquid always involves an undesirable increase in gas pressure, which, by reason of the differential action of the main or working piston, leads to a shift in its static and dynamic neutral position. As this seriously impairs dependability of operation, care must be taken that the dynamic neutral position of automotive suspension means shall change only slightly if at all.

There have therefore been previous attempts, in hydropneumatic shock absorbers and spring suspension systems, to correct the thermal volume changes of hydraulic liquid in the cylinder so as to achieve a constant neutral position of the main piston. Such continual correction is accomplished in known shock absorbers and spring suspensions by means of control elements placed outside the shock-absorber and spring assemblies, the control movements of such elements serving to force or draw more or less hydraulic liquid into the cylinder. Similarly, there have been attempts to allow the escape of gas or to admit additional gas into the cylinder. The flow of gas or liquid involved in such regulations is effected by pumps of known type.

The object of the invention is to provide a hydraulic shock absorber, intended particularly for automotive vehicles, which is equipped with means for compensating temperature-dependent volume changes of a hydraulic liquid but much simpler in construction than the known devices while still ensuring proper control of the hydraulic liquid so as to preserve a constant dynamic neutral position of the main piston. This is accomplished, according to the invention, essentially by arranging the control member for compensating thermal volume changes inside the cylinder, such control member preferably comprising the separating means provided between the hydraulic liquid and the compressed gas, such separating means axially dividing the interior of the cylinder into a liquid-filled dashpot chamber and a gas-filled cushion chamber and at the same time, in the manner of a slide valve, acting upon liquid inlets and outlets suitably arranged in the cylinder wall and connected respectively to the pressure side of a feed pump and the intake side of a liquid reservoir. The separating member—preferably a piston—thus ensures that upon a gain in the volume of the hydraulic liquid, in the event of any considerable heating, a corresponding quantity of liquid is drawn to the outside, whereas in the contrary event, namely upon volume reduction as a result of corresponding cooling, the quantity of liquid required to preserve the original spring characteristic is returned to the cylinder from the outside.

The device according to the invention will now be more fully described with reference to the accompanying drawing, it being understood that same is given by way of illustration and not of limitation and that many changes in the details thereof may be made without departing from the spirit of the invention.

In the drawing,

FIGS. 4, 5 and 6 show additional embodiments of cylinders according to the invention.

Figure 1:
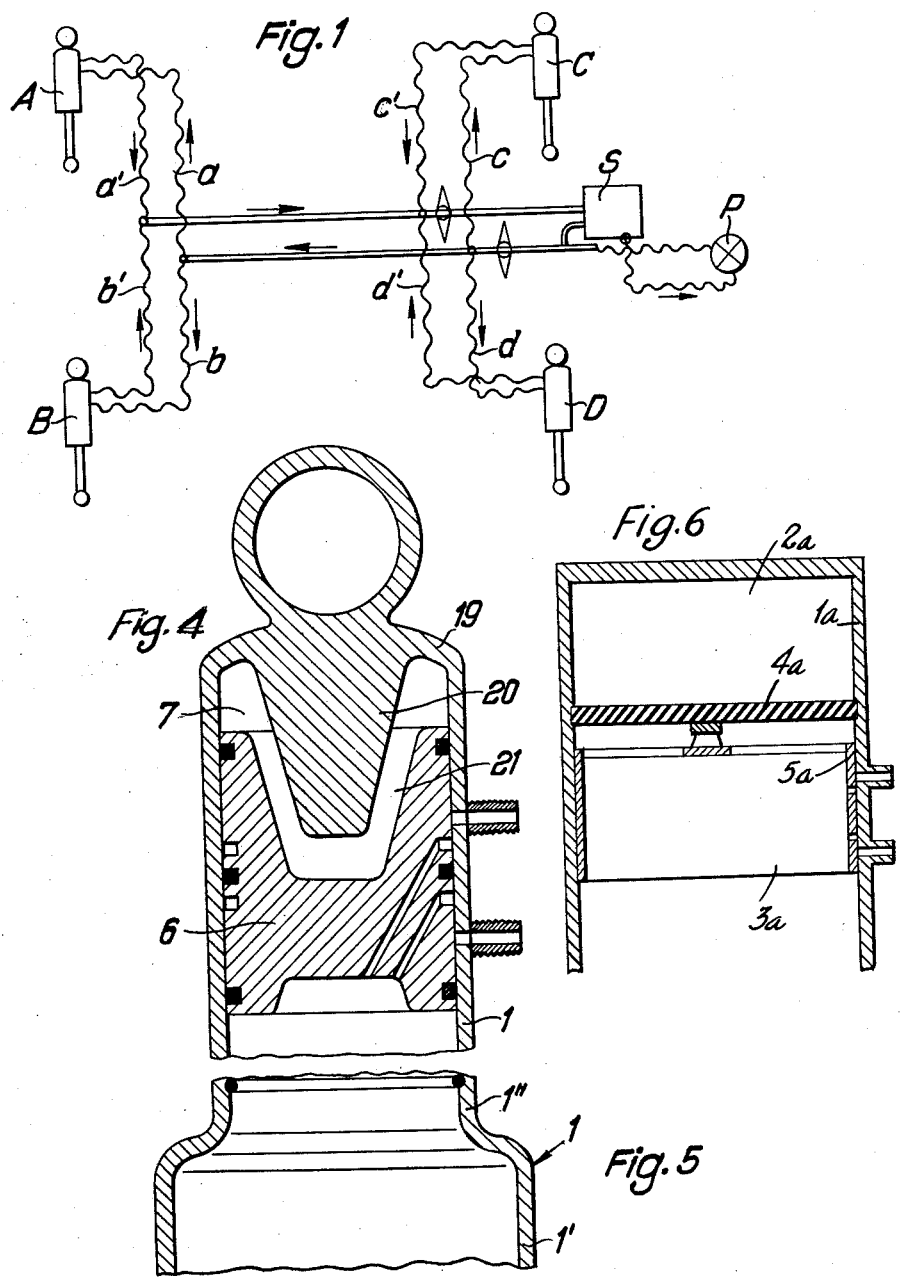
FIG. 1 shows a diagram of a suspension system with four shock-absorber cylinders.

In the diagram of a hydraulic suspension system as illustrated in FIG. 1, the four shock-absorber cylinders A, B, C and D are each connected by a liquid-pressure line $a$, $b$, $c$ and $d$ to a feed pump P. The latter is preceded by a reservoir S full of hydraulic liquid and connected in turn to cylinders A, B, C and D by liquid withdrawal lines $a'$, $b'$, $c'$, and $d'$ respectively.

Figure 2:
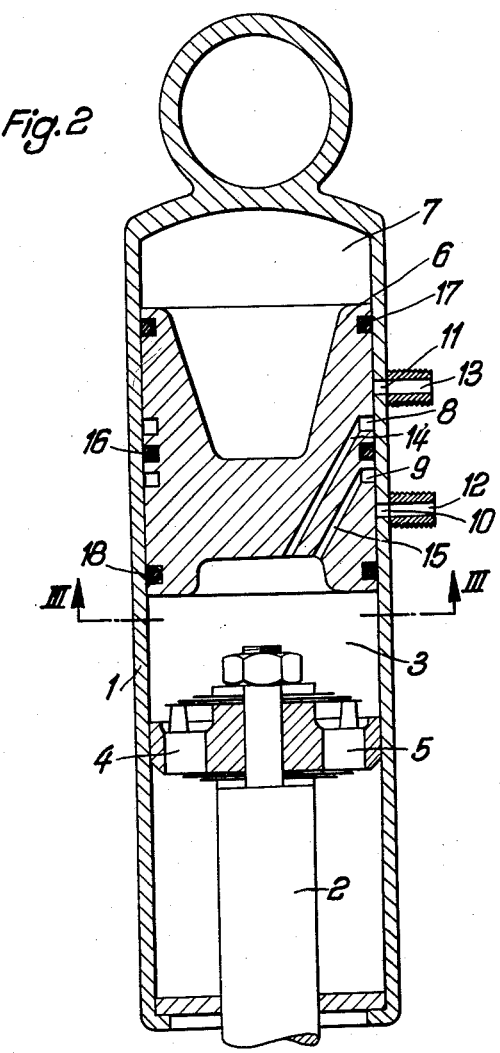
FIG. 2 shows an embodiment of a cylinder according to the invention.

The shock-absorber cylinders are constructed in detail as shown in FIG. 2. The cylinder 1 is provided with a differential main piston 2, slidably arranged in a working or dashpot chamber 3 filled with hydraulic liquid, the desired damping action being produced in the course of its stroke with the aid of valve orifices 4, 5. Above the chamber 3 a separating piston 6 is provided, closing the hydraulic liquid off from the gas-filled cushion chamber 7 of the cylinder. The separating piston 6 has a roughly H-shaped axial section.

Figure 3:
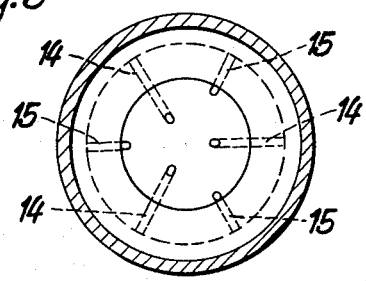
FIG. 3 shows a section along the line III—III in FIG. 2.

Now according to the invention, the separating piston 6 is provided with two annular grooves 8 and 9 whose mutual distance corresponds to the normal stroke of the separating piston and which each cooperate with a liquid inlet 10 and a liquid outlet 11, provided in the cylinder. The inlet 10 is connected by a nipple 12 to the pressure line (for example, $a$) of the feed pump P, while the outlet 11 communicates via nipple 13 and the drain line (for example, $a'$) with the reservoir S. The annular grooves 8 and 9 are connected to the liquid-filled working chamber 3 of the cylinder by oblique passages 14 and 15, respectively, provided in the separating piston 6. As FIG. 3 shows, passages 14 as well as 15 are uniformly distributed about the periphery of the separating piston 6, alternating with each other. Preferably, each annular groove is provided with three passages placed 120° apart. The equispatial arrangement of passages 14 and 15 ensures uniform pressure distribution over the separating piston, thus preventing it from binding. Between the annular grooves 8 and 9, as well as between them and the cushion chamber 7, and between them and the working chamber 3, packing rings 16, 17, 18 are provided to seal the said chambers and grooves suitably from each other.

In normal operating condition, the separating piston 6, under the influence of the movements of the main piston 2 and the hydraulic liquid displaced by it, executes corresponding reciprocating movements about its neutral position. Now if the hydraulic liquid becomes heated, whether because of conversion of mechanical energy into heat in the course of operation, or because of a corresponding rise in outside temperature, the resulting thermal expansion of the hydraulic liquid in the working chamber 3 will tend to shift the neutral position of the separating piston 6 upwards. But such a change is prevented when the shock-absorber system is constructed according to the invention, because the annular groove 8 on the separating piston will slide over the liquid outlet 11 as the piston moves, so that a corresponding quantity of the volume of liquid under pressure in the working chamber can escape through the oblique passages 14 into the drain line a' leading to the reservoir. In this way the necessary compensation is effected, and the original neutral position of the separating piston 6 is restored. The situation is similar upon excessive cooling of the hydraulic liquid, as may for example occur under low outside temperatures. In that case, the normal stroke of the separating piston will bring the lower annular groove 9 over the liquid inlet 10, communicating with the feed pump P via the pressure line a. This introduces a corresponding quantity of additional hydraulic liquid into the working chamber 3, thus again restoring the original neutral position of separating piston 6 and hence also of main piston 2.

In the above manner, then, the spring characteristic of the compressed gas above the separating piston 6 is made to remain practically unchanged, within the allowable limits, independently of the temperature of the hydraulic liquid.

The configuration of the cushion chamber 7 above the separating piston 6 is not limited to the embodiment illustrated in FIG. 2. It will depend on the spring action desired for the particular application. Thus it may sometimes by of advantage for the cushion chamber 7, while retaining the stroke of separating piston 6, to be comparatively small, so that for like displacements of the main piston 2 and/or the separating piston 6 a comparatively higher pressure gradient of the gas and hence a steeper spring characteristic, or stiffer spring action, is obtained. For this purpose, as FIG. 4 shows, the head 19 of cylinder 1, enclosing the gas chamber 7, may be provided with a tapering boss 20 corresponding to a recess 21 on the upper side of the separating piston 6. Again, the spring characteristic may be altered, as in the embodiment illustrated in FIG. 5, by making the portion 1' of cylinder 1, containing the hydraulic liquid and the differential piston, greater than its portion 1", containing the separating piston 6 and cushion chamber 7.

Instead of the separating piston 6 described for the embodiments, a flexible cap or diaphragm may alternatively be provided between the liquid-filled working chamber 3 and the gas-filled cushion chamber 7. In that case, in order to obtain the desired control functions according to the invention, it is sufficient to provide a control means at a suitable point on the flexible cap or diaphragm, to be brought into proper position for discharging or admitting hydraulic liquid by the movements of the diaphragm.

FIG. 6 illustrates such an embodiment, wherein 1a is the cylinder, 2a the pressure-gas chamber, 3a the liquid chamber, 4a an elastic membrane and 5a a slide valve connected with the latter.

Finally, it should be added that the use of a differential main piston permits comparatively low gas pressures, so that any forcing of liquid into the cylinder can be accomplished with a pump of comparatively small head and delivery capacity. A pump output of at most 2 horsepower being ordinarily quite sufficient, such a pump may readily be driven by the engine of a vehicle.

What I claim is:

1. A hydraulic shock absorber for automotive vehicles and the like, comprising a cylinder, movable separating means in said cylinder axially subdividing the interior thereof into a normally closed dashpot chamber filled with a hydraulic liquid and a closed cushion chamber filled with a compressible gas, the volumes of said chambers being inversely variable by axial displacement of said separating means, a working piston in said dashpot chamber provided with a restricted passage for said liquid, said piston having a stem projecting outwardly from said cylinder for engagement with a load whereby said piston is axially displaceable in said dashpot chamber with damped motion in response to varying load conditions, valve means in said cylinder constituted at least in part by said separating means, said cylinder being provided with an inlet and an outlet for said hydraulic liquid, an external source of hydraulic liquid connected to said inlet, and an external reservoir for said liquid connected to said outlet, said inlet and said outlet being normally blocked by said valve means and being individually connectable by said valve means with said dashport chamber upon a displacement of said separating means beyond predetermined limits by thermal contraction and expansion, respectively, of said hydraulic liquid in said cylinder.

2. A shock absorber according to claim 1, wherein said separating means comprises a floating piston provided with two axially spaced annular grooves and first and second channels respectively communicating with said grooves, said first and second channels being alternately disposed about the cylinder axis within said floating piston, said annular grooves being respectively alignable with said inlet and said outlet.

3. A shock absorber according to claim 2, further comprising sealing rings on the periphery of said floating piston intermediate said annular grooves and between said grooves and said cushion chamber.

4. A shock absorber according to claim 2, wherein said floating piston is generaly H-shaped in axial section.

5. A shock absorber according to claim 2, wherein said cylinder is formed at one end with a tapered internal projection extending within said cushion chamber toward said further piston, the latter being provided with a substantially complementary recess on its face adjacent said projection.

6. A shock absorber according to claim 1, wherein said dashpot chamber has an enlarged portion substantially exceeding said cushion chamber in diameter, said working piston being lodged in said enlarged portion.

References Cited in the file of this patent

UNITED STATES PATENTS

| 1,861,821 | Schaum | June 7, 1932 |
| 2,620,182 | Marston et al. | Dec. 2, 1952 |
| 2,701,714 | Harwood | Feb. 8, 1955 |
| 2,901,243 | Boulet | Aug. 25, 1959 |

FOREIGN PATENTS

| 1,092,457 | France | Nov. 10, 1954 |